US012586223B2

(12) United States Patent
Song et al.

(10) Patent No.: US 12,586,223 B2
(45) Date of Patent: Mar. 24, 2026

(54) METHOD FOR RECONSTRUCTING THREE-DIMENSIONAL OBJECT COMBINING STRUCTURED LIGHT AND PHOTOMETRY AND TERMINAL DEVICE

(71) Applicant: SHENZHEN INSTITUTES OF ADVANCED TECHNOLOGY CHINESE ACADEMY OF SCIENCES, Shenzhen (CN)

(72) Inventors: Zhan Song, Shenzhen (CN); Zhao Song, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 553 days.

(21) Appl. No.: 17/927,692

(22) PCT Filed: Nov. 17, 2020

(86) PCT No.: PCT/CN2020/129563
§ 371 (c)(1),
(2) Date: May 17, 2023

(87) PCT Pub. No.: WO2022/021680
PCT Pub. Date: Feb. 3, 2022

(65) Prior Publication Data
US 2023/0298189 A1     Sep. 21, 2023

(30) Foreign Application Priority Data
Jul. 28, 2020     (CN) ......................... 202010738438.5

(51) Int. Cl.
*G06T 7/521*          (2017.01)
*G01B 11/25*          (2006.01)
(Continued)

(52) U.S. Cl.
CPC ............ *G06T 7/521* (2017.01); *G01B 11/254* (2013.01); *G06T 7/80* (2017.01); *G06V 10/60* (2022.01)

(58) Field of Classification Search
CPC ....... G06T 7/521; G06T 7/80; G06T 2200/08; G06T 2207/10016; G06T 2207/10152;
(Continued)

(56) References Cited

FOREIGN PATENT DOCUMENTS

| CN | 107228625 A | 10/2017 | |
| CN | 110879947 A | 3/2020 | |
| WO | WO-2020168094 A1 * | 8/2020 | ............. G06T 7/521 |

OTHER PUBLICATIONS

CN107228625 Xu et al., Google translated (Year: 2017).*
(Continued)

*Primary Examiner* — Jianxun Yang
(74) *Attorney, Agent, or Firm* — Nitin Kaushik

(57)          ABSTRACT

The present application is applicable to the technical field of computer vision, and provides a method for reconstructing a three-dimensional object combining structured light and photometry and a terminal device, wherein the method comprises: acquiring N first images, wherein each first image is obtained by shooting after a coded pattern having a coding stripe sequence is projected to a three-dimensional object, and N is a positive integer; determining structured light depth information of the three-dimensional object based on the N first images; acquiring M second images, wherein the M second images are obtained by shooting after P light sources are respectively projected to the three-dimensional object from different directions, and M and P are positive integers; determining photometric information of the three-dimensional object based on the M second images; and reconstructing the three-dimensional object based on the structured light depth information and the
(Continued)

photometric information. Therefore, the structured light system and the photometric system are combined to reconstruct the three-dimensional object, and the precision of a three-dimensional reconstruction result of the three-dimensional object with complex surfaces is improved.

7 Claims, 24 Drawing Sheets

(51) Int. Cl.
    *G06T 7/80*        (2017.01)
    *G06V 10/60*     (2022.01)

(58) Field of Classification Search
    CPC ......... G06T 7/586; G06T 17/00; G06T 15/50;
                      G01B 11/254; G01B 11/24; G01B
                  11/2527; G01B 11/2536; G06V 10/60
    See application file for complete search history.

(56)             References Cited

OTHER PUBLICATIONS

Title of the Item: "Basic Sciences, China Master's ThesesFull-Text Database" Publication date: May 15, 2019 Name of the Author: Liu Wenjing Article Title:"Underater 3D Reconstruction of Fusing Photometric Stereo and Structured Light".

Title of the Item: "Information Science and Technology, Chinese Master's Theses Full-Text Database" Publication date: Jul. 15, 2016 Name of the Author: Yang Jie Article Title: "Fusing Depth and Multispectral Photometric Stereo for 3D Reconstruction and its Applications in Underwater Environment".

Title of the Item: "symmetry" Publication date: May 7, 2020 Name of the Author: Li Meiying et al. Article Title:"Structured Light 3D Reconstruction System Based on a Stereo Calibration Plate" volume-issue No. 2020, 12, 772; doi:10.3390/sym12050772.

* cited by examiner

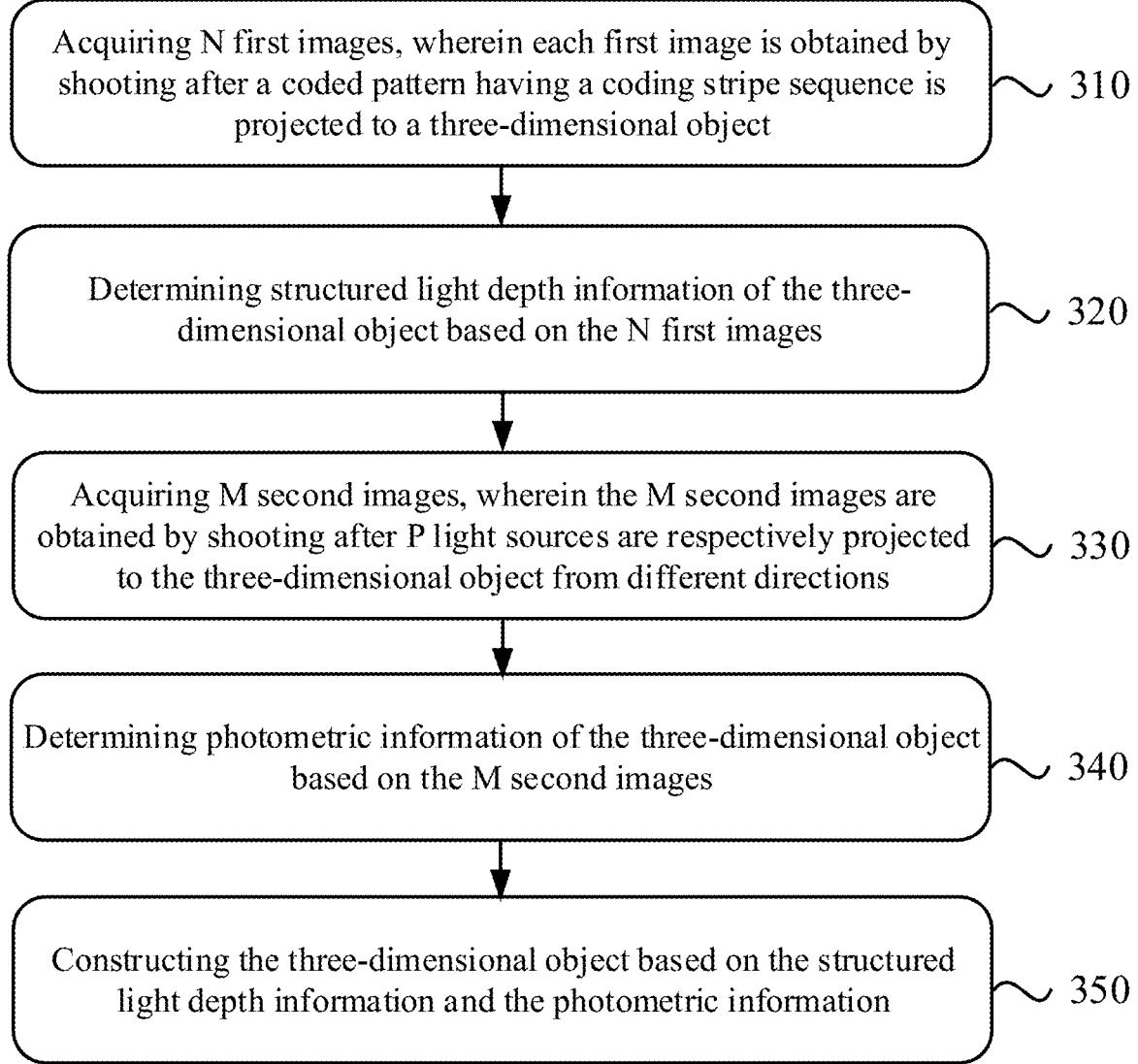

Acquiring N first images, wherein each first image is obtained by shooting after a coded pattern having a coding stripe sequence is projected to a three-dimensional object    310

Determining structured light depth information of the three-dimensional object based on the N first images    320

Acquiring M second images, wherein the M second images are obtained by shooting after P light sources are respectively projected to the three-dimensional object from different directions    330

Determining photometric information of the three-dimensional object based on the M second images    340

Constructing the three-dimensional object based on the structured light depth information and the photometric information    350

FIG. 3

Acquiring a target surface type of the three-dimensional object    ~ 710

Determining a reflection model matched with the target surface type from a preset reflection model set    ~ 720

Inputting the M second images into the determined reflection model to output photometric information of the three-dimensional object by the reflection model    ~ 730

METHOD FOR RECONSTRUCTING THREE-DIMENSIONAL OBJECT COMBINING STRUCTURED LIGHT AND PHOTOMETRY AND TERMINAL DEVICE

CROSS-REFERENCE TO RELATED APPLICATIONS

The application claims priority to Chinese patent application No. 202010738438.5, filed on Jul. 28, 2020, the entire contents of which are incorporated herein by reference.

TECHNICAL FIELD

The present application belongs to the technical field of computer vision, and particularly relates to a method for reconstructing a three-dimensional object combining structured light and photometry and a terminal device.

BACKGROUND

The three-dimensional scanning technology develops rapidly, and is applied to various fields and industries such as industrial detection, design, cartoon and film special effect production, 3D display, virtual operation, and reverse engineering.

From the existing three-dimensional scanning technical means, the laser three-dimensional scanning and projection structured light three-dimensional scanning technology is taken as the main technology, a laser three-dimensional scanning system utilizes a projection laser line or a dot matrix to capture the characteristics of the projected laser and recovers the three-dimensional depth information of an object through triangulation, but the point-by-point and line-by-line scanning mode has the main defect of low speed. In a structured light three-dimensional scanning system based on a projector, the structured light coding technology is used for realizing one-time measurement of the whole surface, and the structured light three-dimensional scanning system has the obvious advantages of high speed and high precision, so that the structured light three-dimensional scanning technology based on projection becomes the mainstream technical means at present.

At present, a structured light three-dimensional scanning system based on a projector can generate a better reconstruction effect on a non-textured Lambert surface of an object, and three-dimensional object reconstruction (or three-dimensional reconstruction) refers to constructing a three-dimensional model corresponding to the object. However, for a textured Lambert surface and a non-Lambert surface of an object, there are errors due to the reflectivity and texture of the object surface due to the effect of the texture of the object surface on the positioning of the stripes (e.g., reflectivity and internal occlusion), resulting in poor reconstruction precision of the object.

SUMMARY

In view of this, the embodiments of the present application provide a method for reconstructing a three-dimensional object combining structured light and photometry and a terminal device, so as to solve the problem that the accuracy of a three-dimensional reconstruction result for an object with complex surfaces (a textured Lambert surface and a non-Lambert surface) is not high.

A first aspect of an embodiment of the present application provides a method for reconstructing a three-dimensional object combining structured light and photometry, comprising: acquiring N first images, wherein each first image is obtained by shooting after a coded pattern having a coding stripe sequence is projected to a three-dimensional object, and N is a positive integer; determining structured light depth information of the three-dimensional object based on the N first images; acquiring M second images, wherein the M second images are obtained by shooting after P light sources are respectively projected to the three-dimensional object from different directions, and M and P are positive integers; determining photometric information of the three-dimensional object based on the M second images; and reconstructing the three-dimensional object based on the structured light depth information and the photometric information.

A second aspect of an embodiment of the present application provides an apparatus for reconstructing a three-dimensional object combining structured light and photometry, comprising: a structured light image acquisition unit, configured for acquiring N first images, wherein each first image is obtained by shooting after a coded pattern having a coding stripe sequence is projected to a three-dimensional object, and N is a positive integer; a structured light depth information determination unit, configured for determining structured light depth information of the three-dimensional object based on the N first images; a photometric image acquisition unit, configured for acquiring M second images, wherein the M second images are obtained by shooting after P light sources are respectively projected to the three-dimensional object from different directions, and M and P are positive integers; a photometric information determination unit, configured for determining photometric information of the three-dimensional object based on the M second images; and a three-dimensional object reconstruction unit, configured for reconstructing the three-dimensional object based on the structured light depth information and the photometric information.

A third aspect of an embodiment of the present application provides a terminal device comprising a memory, a processor and a computer program stored in the memory and executable on the processor, wherein the processor, when executing the computer program, implements the steps of the method as described above.

A fourth aspect of an embodiment of the present application provides a computer-readable storage medium having a computer program stored therein, wherein the computer program, when executed by a processor, implements the steps of the method as described above.

A fifth aspect of an embodiment of the present application provides a computer program product, wherein the computer program product, when running on a terminal device, causes the terminal device to implement the steps of the method as described above.

Compared with the prior art, the embodiments of the present application have the following beneficial effects:

The structured light depth image (or three-dimensional point cloud information) of the three-dimensional object is acquired by using the structured light system, meanwhile, the images of the three-dimensional object in different directions are acquired by using the photometric system, such that the structured light depth information of the three-dimensional object can be acquired, and meanwhile, the photometric information of the three-dimensional object can be acquired, and the three-dimensional object is further reconstructed by combining the structured light depth information and the photometric information. Therefore, the structured light system and the photometric system are combined to position and reconstruct the three-dimensional object, and the photometric information can be utilized to correct the positioning error of the structured light stripes caused by the surface texture (such as, texture reflectivity) of the three-dimensional object, so that the accuracy of the three-dimensional reconstruction result of the three-dimensional object with complex surfaces is improved.

BRIEF DESCRIPTION OF THE DRAWINGS

In order to more clearly explain the technical solutions in the embodiments of the present application, the following will briefly introduce the drawings needed in the description of the embodiments or the prior art. Obviously, the drawings in the following description are only some embodiments of the present application. For those of ordinary skill in the art, other drawings can be obtained according to these drawings without any creative effort.

FIG. 3 shows a flowchart of an example of the method for reconstructing a three-dimensional object combining structured light and photometry according to an embodiment of the present application;

DETAILED DESCRIPTION

Figure 1:
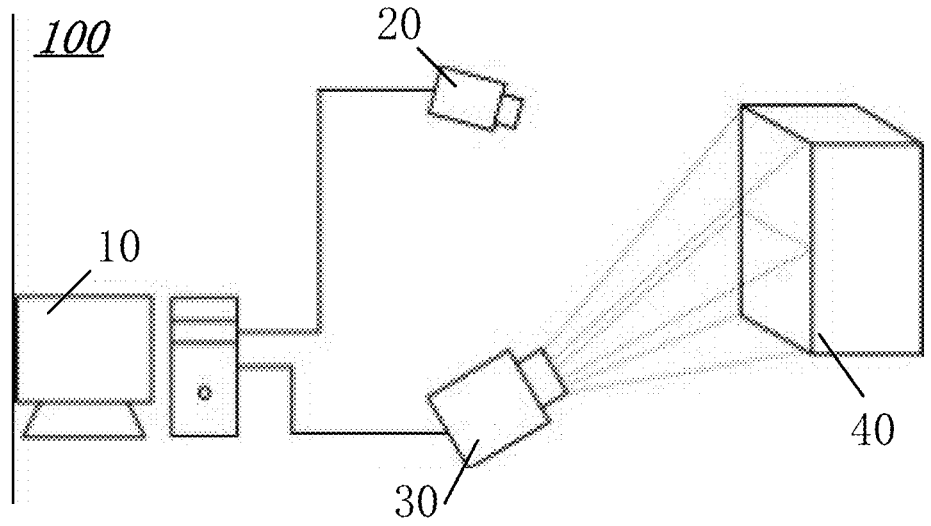
FIG. 1 shows a schematic architectural diagram of an example of a structured light system suitable for applying the method for reconstructing a three-dimensional object combining structured light and photometry according to an embodiment of the present application.

The core of the structured light three-dimensional scanning system is a coding and decoding algorithm. The existing structured light three-dimensional scanning technologies can be divided into time coding, space coding and mixed coding according to a coding mode.

The time coding structured light technology is widely researched and used due to the advantages of large coding capacity and high reconstruction resolution, and commonly-available time coding solutions include Gray code structured light coding (such as Gray code sequence, Gray code sequence plus line shift and Gray code sequence plus phase shift) and binary structured light coding (with "0" (pure black) and "255" (pure white) as coding elements). In addition, the structured light technology that projects by utilizing a stripe sequence (i.e., a coded pattern) coded with different gray values and decodes based on stripe positioning are referred to as the stripe structured light technology, e.g., when a binary coded pattern is employed, the corresponding stripe structured light technology may be referred to as a binary stripe structured light technology.

In the stripe structured light technology, the positioning and decoding precision of the stripes is an important factor influencing the three-dimensional reconstruction result. For a non-textured Lambert surface, the modulation of the stripe profile is derived from the surface shape, and the stripe structured light technology can obtain micrometer-scale measurement precision. For a non-Lambert surface, the modulation of the stripe profile is related to surface texture and the change in the surface reflectivity besides the surface shape, and the stripe structured light technology usually ignores the modulation of the stripe boundary profile by the surface reflectivity and the texture, so that the textured Lambert surface and the non-Lambert surface cannot be reconstructed more accurately, and when a complex scene is reconstructed, the occlusion and internal reflection caused by the object shape cause the pollution of coded information, so that the reconstruction result is also easy to generate noise and errors.

The photometric three-dimensional scanning system takes target images from different lighting directions of a three-dimensional object as an input, and then establishes an equation to solve the normals and the reflectivity of the surface of the object based on an assumed object surface reflection characteristic model (or a reflection model), so that the model of the three-dimensional object is reconstructed. Here, commonly-available reflection characteristic models include a Lambert reflection model (Lambert surface), a Phong reflection model (highly-reflective surface), a BRDF (general surface), and the like.

However, the surfaces of the three-dimensional object may be complex surfaces, for example, the surfaces may consist of sub-areas with different reflection characteristics, and the use of a single optical model assumption may result in a large calculation error of the normal field, and it is difficult to obtain absolute depth information of the three-dimensional object by a single photometric method, such that the precision of the reconstructed three-dimensional object is relatively low.

In the following description, for the purpose of explanation rather than limitation, specific details such as specific system architecture and technology are set forth in order to provide a thorough understanding of the embodiments of the present application. However, it should be clear to those skilled in the art that the present application can be implemented in other embodiments without these specific details. In other cases, detailed descriptions of well-known systems, apparatuses, circuits and methods are omitted so as not to obscure the description of the present application with unnecessary details.

In order to explain the technical solutions of the present application described above, the following description will be given by way of specific examples.

It should be understood that the terms "comprise", "comprising" and "include", when used in this specification and the appended claims, indicate the presence of stated features, entirety, steps, operations, elements, and/or components, but do not preclude the presence or addition of one or more other features, entirety, steps, operations, elements, components, and/or collections thereof.

It should also be understood that the terminology used in this specification of the present application is for the purpose of describing particular embodiments only and is not intended to limit the present application. As used in this specification and the appended claims, the singular forms "a", "an" and "the" are intended to include the plural forms as well, unless the context clearly indicates otherwise.

In particular implementations, the mobile terminals described in embodiments of the present application include, but are not limited to, other portable devices such as mobile phones, laptop computers, or tablet computers having touch-sensitive surfaces (e.g., touch screen displays and/or touch pads). It should also be understood that in some embodiments, the devices described above are not portable communication devices, but are desktop computers having touch-sensitive surfaces (e.g., touch screen displays and/or touch pads).

In the following discussion, a mobile terminal comprising a display and a touch-sensitive surface is described. However, it should be understood that a mobile terminal may include one or more other physical user interface devices such as a physical keyboard, mouse, and/or control rod.

Various applications executable on the mobile terminal may use at least one common physical user interface device, such as a touch-sensitive surface. One or more functions of the touch-sensitive surface and corresponding information displayed on the terminal may be adjusted and/or changed between applications and/or within respective applications. In this way, a common physical architecture (e.g., a touch-sensitive surface) of the terminal may support various applications with user interfaces that are intuitive and transparent to users.

In addition, in the description of the present application, the terms "first", "second", "third", and the like are used solely to distinguish one from another, and are not to be construed as indicating or implying relative importance.

FIG. 1 shows a schematic architectural diagram of an example of a structured light system suitable for applying the method for reconstructing a three-dimensional object combining structured light and photometry according to an embodiment of the present application.

As shown in FIG. 1, a computer 10, a camera 20, a projector 30, and an object (or, an object to be reconstructed) 40 are arranged in a structured light system 100. The coded pattern of the projector 30 may be set by the computer 10, and when three-dimensional reconstruction is required, the projector 30 projects a projection onto a designated area (e.g., an area for placing the object 40). Furthermore, an image of the object 40 in the designated area may be acquired by the camera 20, and the computer 10 may decode the coded information in the image of the object acquired by the camera 20 to reconstruct three-dimensional information of the object.

It should be understood that the types of devices described above in connection with FIG. 1 are merely examples, e.g., the camera 20 may be replaced with other devices having the image acquisition function, the computer 10 may be other mobile terminals having the processing function, and so on.

Figure 2:
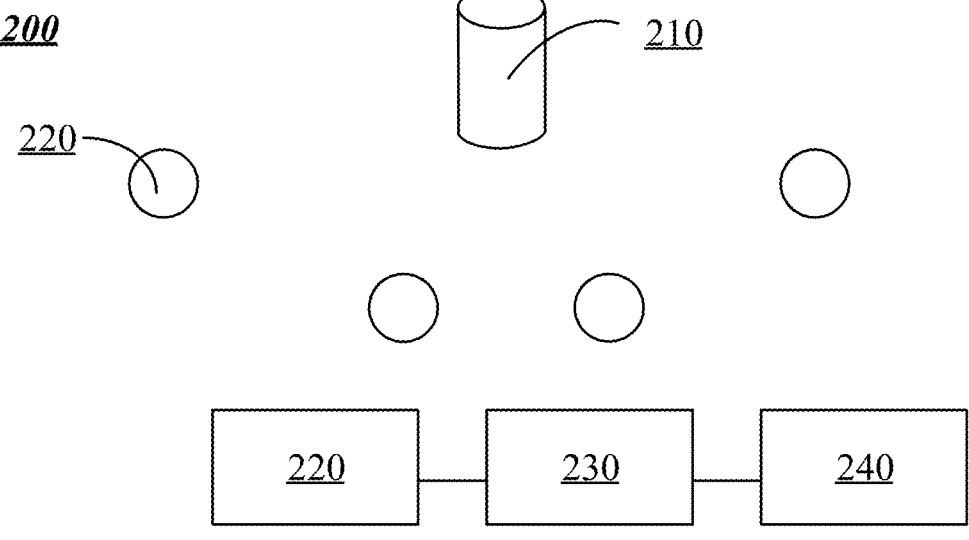
FIG. 2 shows a schematic architectural diagram of an example of a photometric system suitable for applying the method for reconstructing a three-dimensional object combining structured light and photometry according to an embodiment of the present application.

FIG. 2 shows a schematic architectural diagram of an example of a photometric system suitable for applying the method for reconstructing a three-dimensional object combining structured light and photometry according to an embodiment of the present application.

As shown in FIG. 2, a photometric system 200 is provided with an object (or, an object to be reconstructed) 210, a plurality (for example, P, which is a positive integer) of surface light sources 220, a control board 230, and a camera 240. When a three-dimensional reconstruction operation is required, the control board 230 may control the plurality of surface light sources 220 to alternately perform lighting, and the camera 240 may acquire gray-scale images corresponding to different light source directions. Furthermore, the control board 230 can obtain a reflection equation and normal vectors of the object surface based on each gray-scale image, and integrate the normal vectors to restore the relative heights of points on the object surface, so as to reconstruct the three-dimensional information of the object.

It should be understood that the types of devices described above in connection with FIG. 2 are merely examples, e.g., the control board 230 may be replaced with other mobile terminals having the processing function, surface light sources of multiple orientations may be replaced with point light sources, and so on. In addition, the structured light system in FIG. 1 and the photometric system in FIG. 2 can be combined, and the combined system can realize the functions of the structured light system and the photometric system and simplify the hardware devices of the system, for example, a camera, a computer and the like can be shared between two systems.

FIG. 3 shows a flowchart of an example of the method for reconstructing a three-dimensional object combining structured light and photometry according to an embodiment of the present application. The three-dimensional object reconstruction method of the embodiment of the present application may be implemented by a mobile terminal (e.g., the computer 10) and is intended to reconstruct a three-dimensional object with high precision by performing a control or processing operation.

As shown in FIG. 3, in step 310, N first images are acquired, wherein N is a positive integer. Here, each first image is obtained by shooting after a coded pattern having a coding stripe sequence is projected to a three-dimensional object. Illustratively, the structured light system (as shown in FIG. 1) may be used to project a preset number of coded patterns and acquire the coded patterns on the three-dimensional object, so as to obtain corresponding images.

Here, the number N of the first images may be matched with the number of the projected coded patterns, for example, when 8 coded patterns are projected, the number of the correspondingly acquired detection object patterns may also be 8. It needs to be noted that the number of coded patterns may be related to the number of coding bits, for example, when an 8-bit coding sequence is adopted, the number of the corresponding coded patterns is 8.

In addition, each coded pattern has a unique coding stripe sequence consisting of a plurality of parallel coding stripes and stripe boundaries between adjacent coding stripes. In the embodiments of the present application, various stripe positioning solutions (e.g., pixel-centric decoding positioning solutions) may be employed. In some embodiments, a decoding positioning solution based on stripe boundaries may also be adopted, so as to achieve a positioning effect with high precision (e.g., at a sub-pixel level), and more details will be described below.

It needs to be noted that the coded pattern in the embodiments of the present application may adopt coded patterns in various structured light stripe coding technologies, for example, a binary structured light coded pattern, a Gray code structured light coded pattern, or a binary Gray code pattern, and the present application should not be limited thereto.

Figure 4:
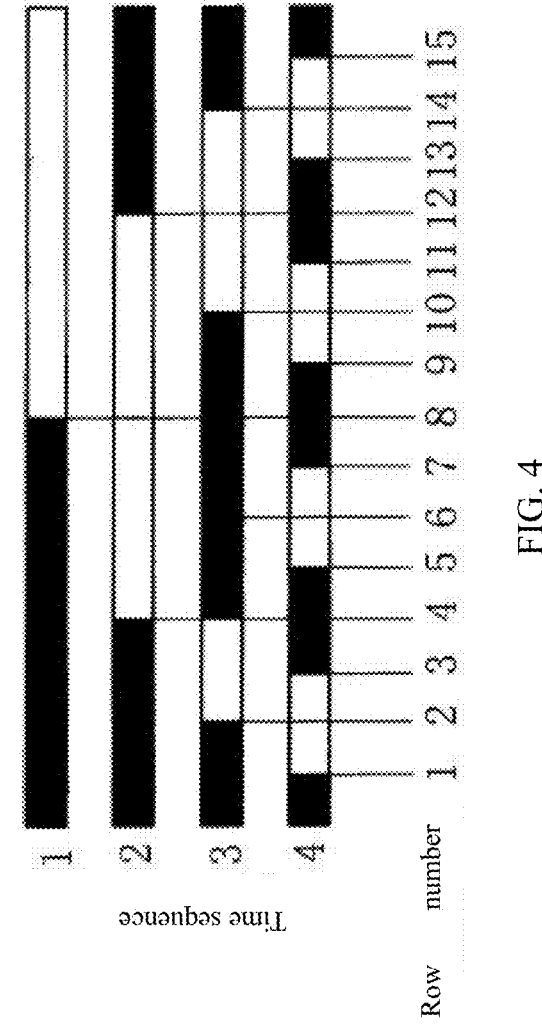
FIG. 4 shows a schematic diagram of an example of a structured light coded pattern with 4-bit Gray codes.

FIG. 4 shows a schematic diagram of an example of a structured light coded pattern with 4-bit Gray codes.

As shown in FIG. 4, when the three-dimensional reconstruction is performed by using a structured light coded pattern with 4-bit Gray codes, it is necessary to project 4 coded images at different time sequences, so that the Gray code pattern comprises $2^4-1=15$ stripe boundaries, each stripe boundary having a corresponding row number and a corresponding coding value. In the 4 Gray-code structured light coded patterns having different time sequences, the stripe boundaries in different intensity images are not overlapped with each other, so that the Gray code values or the phase coding values are not easy to be misjudged, and the mapping relation between the Gray code values and the stripe boundaries can be realized. In addition, when the Gray-code structured light coded pattern consists of black stripes and white stripes, the Gray-code structured light coded pattern is a binary Gray-code structured light coded pattern.

Theoretically, in the Gray code solutions based on the stripe boundaries, when the width of the finest stripe in the coded pattern is 1 pixel, the image sampling point density of the Gray code boundary decoding same as the image sampling point density of the pixel center decoding can be obtained. Therefore, on the basis of projecting the Gray code coded pattern, the line shift pattern can be continuously projected so as to improve the image sampling point density on the basis of decoding the Gray code stripe boundaries, thereby ensuring the sub-pixel precision positioning of the image sampling points.

Figure 5A:
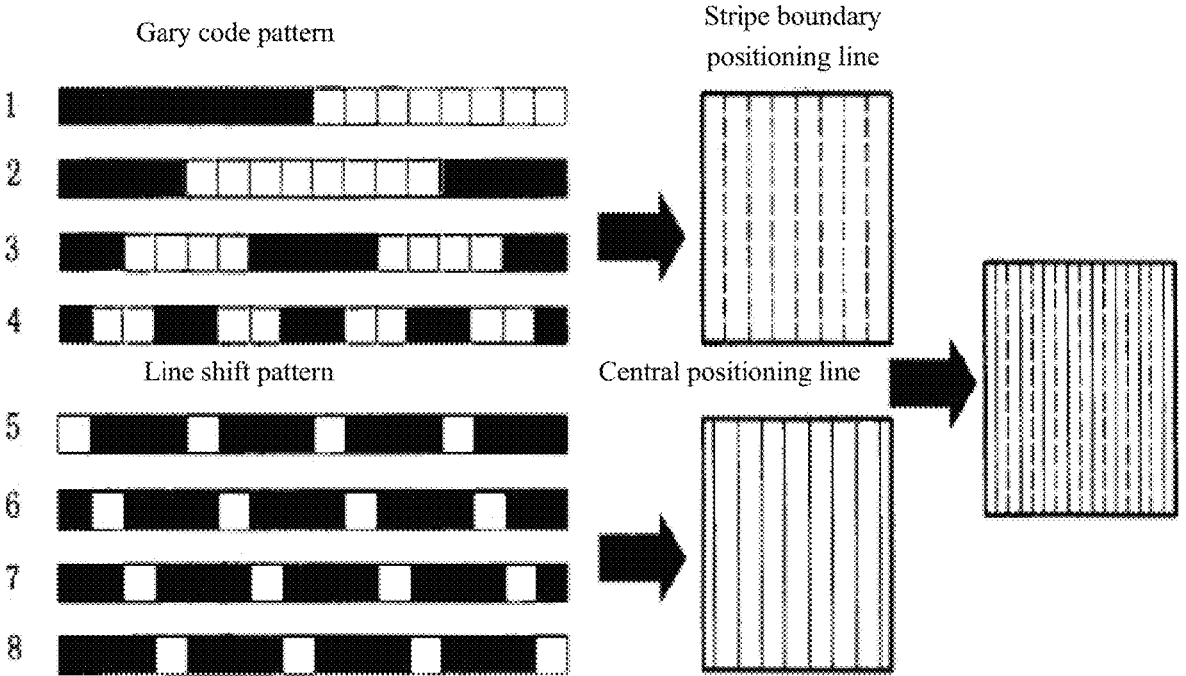
FIG. 5A shows a schematic diagram of an example of a structured light coded pattern with 4-bit Gray codes plus 4-bit line shifts.

FIG. 5A shows a schematic diagram of an example of a structured light coded pattern with 4-bit Gray codes plus 4-bit line shifts.

As shown in FIG. 5A, after 4 Gray code patterns are projected, 4 periodic line-shift stripe patterns may be sequentially projected. The Gray-code stripe boundaries and the line-shift stripe centers are not overlapped and have a distance of 0.5 stripe width. Therefore, the two are combined and decoded, the central positioning lines (solid lines) and the stripe boundary positioning lines (dotted lines) are combined into final positioning lines (the solid lines and the dotted lines appear alternately), the image sampling point density can be improved from a single stripe width to 0.5 stripe width, for example, when the single stripe width is 1 pixel in the intensity image, the image sampling point density is about 0.5 pixel width, and the high-precision positioning at the sub-pixel level can be realized.

Figure 5B:
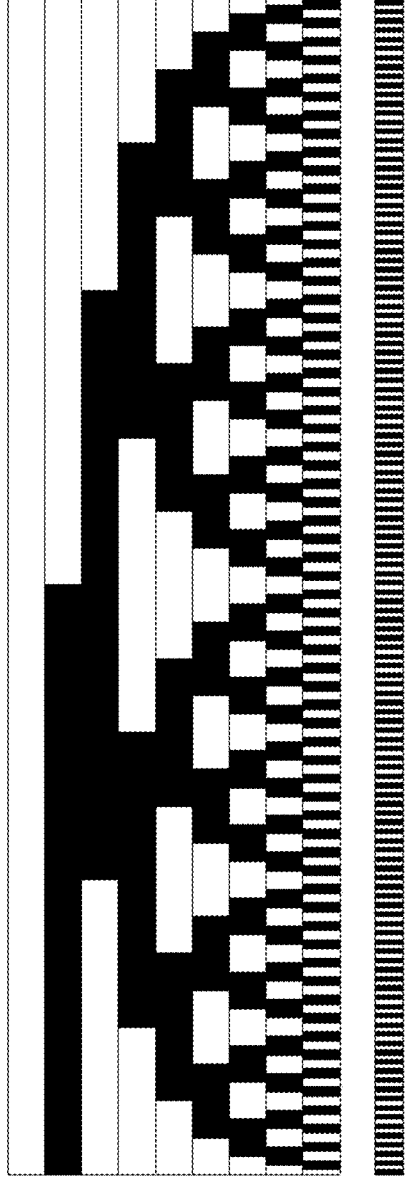
FIG. 5B shows a schematic diagram of an example of a structured light coded pattern with binary Gray codes having 8-bit Gray codes plus 4-bit line shifts.

FIG. 5B shows a schematic diagram of an example of a structured light coded pattern with binary Gray codes having 8-bit Gray codes plus 4-bit line shifts. As described above, the embodiments of the present application may also employ a structured light coded pattern with binary Gray codes having 8-bit Gray codes plus 4-bit line shifts or other coded patterns (e.g., 10-bit Gray codes).

In some examples of the embodiments of the present application, the coded information of the stripe boundaries is directly carried in the coded pattern projected by the projector, which is convenient for decoding but adds a burden to the setting work of the coded pattern, for example, boundary information between adjacent stripes (for example, two adjacent white stripes) having the same gray value may need to be pointed out. In other examples of the embodiments of the present application, the coded pattern may be projected forward and backward (i.e., the gray values of the stripes are inverted) twice. By the forward and backward stripe projection, for example, the coded pattern projected forward is 0-0-0-0-255-255-255-255, and the coded pattern projected backward is 255-255-255-255-0-0-0-0, thus zero cross points of the forward and backward stripes can be taken as stripe boundaries of the coded pattern, and the positioning result of the strips having sub-pixel precision can be obtained by taking intersection points of fitted straight lines of the forward and backward stripes.

In step 320, structured light depth information of the three-dimensional object is determined based on the N first images. Specifically, absolute depth information of the three-dimensional object may be analyzed by analyzing the stripe positioning information of each pixel in the first images and based on the triangulation principle, and the specific details may refer to the description in the related prior art.

In step 330, M second images are acquired. Here, the M second images are obtained by shooting after P light sources are respectively projected to the three-dimensional object from different directions, and M and P are positive integers. Illustratively, the photometric system (as shown in FIG. 2) may be used to alternately control the P surface light sources to perform lighting on the three-dimensional object from different directions, and the camera may be used to acquire images of the three-dimensional object from different angles.

In step 340, photometric information of the three-dimensional object is determined based on the M second images. Here, the photometric information includes normal information and reflectivity, and for example, a reflection equation and a normal vector of the object surface can be obtained from the M second images. In addition, the photometric information may also include other parametric information, such as key luminance values resolved from reflectivity, such as diffuse reflection components, specular reflection components, and refractive components.

In step 350, a three-dimensional object is reconstructed based on the structured light depth information and the photometric information.

It needs to be noted that, although the steps in the flow shown in FIG. 3 are performed sequentially, they are only used as examples and are not intended to be limiting, for example, in some examples, step 330 and step 340 may be performed first, and then step 310 and step 320 may be performed.

In the embodiments of the present application, by combining the structured light system and the photometric system, errors of a structured light positioning result caused by information such as reflectivity and normal vector of texture on the object surface can be reduced or eliminated, the method can be suitable for a three-dimensional object with various complex surfaces, and certain reconstruction precision can be ensured.

Figure 6:
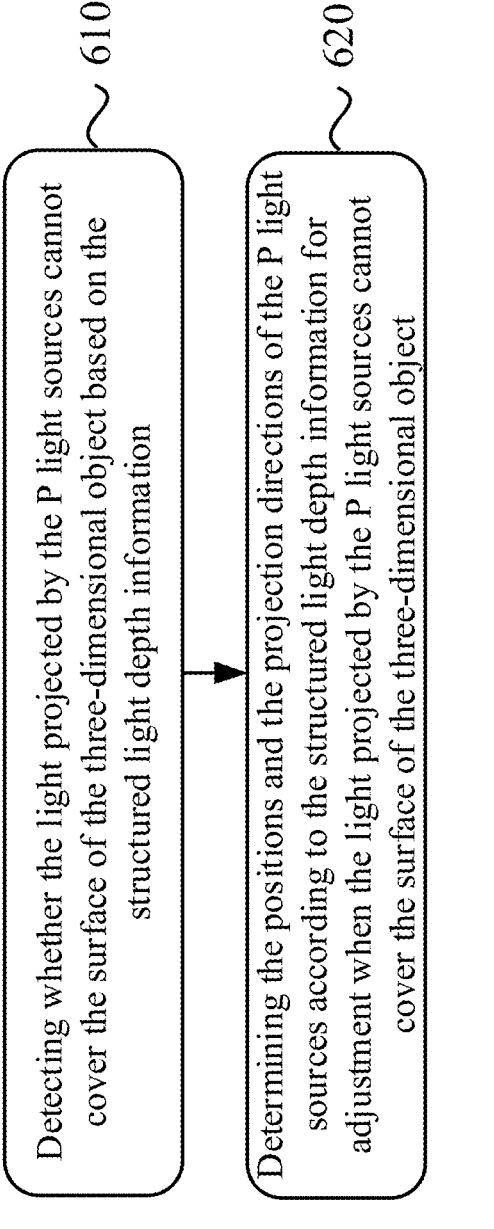
FIG. 6 shows a flowchart of an example of calibrating a light source in a photometric system according to an embodiment of the present application.

It needs to be noted that before the photometric system is used, the orientations of the light sources in the photometric system may be calibrated first, so as to ensure a better photometric stereo reconstruction effect. FIG. 6 shows a flowchart of an example of calibrating a light source in a photometric system according to an embodiment of the present application.

As shown in FIG. 6, in step 610, whether the light projected by the P light sources cannot cover the surface of the three-dimensional object based on the structured light depth information is detected. Here, a preliminary depth map of the three-dimensional object may be determined using the structured light system, and then the light sources in the photometric system may be calibrated using the preliminary depth map.

In step 620, when the light projected by the P light sources cannot cover the surface of the three-dimensional object, the positions and the projection directions of the P light sources are determined according to the structured light depth information. Specifically, the light sources in the structured light system are calibrated through the initial depth image, for example, the suitable positions and projection directions of the light sources are screened within the set position range and direction interval range, such that the light sources of the photometric system can completely cover the surface of the three-dimensional object without an occlusion area.

In the embodiment of the present application, a preliminary three-dimensional point cloud structure of the three-dimensional object can be determined by utilizing the structured light depth information in the preliminary depth map, the projected light of each light source in the current photometric system cannot cover the preliminary three-dimensional point cloud structure, and the occlusion detection is completed by calibrating based on the preliminary three-dimensional point cloud structure and the light sources of the current photometric system, so that the influence of an occlusion part on the photometric system is eliminated.

Figure 7:
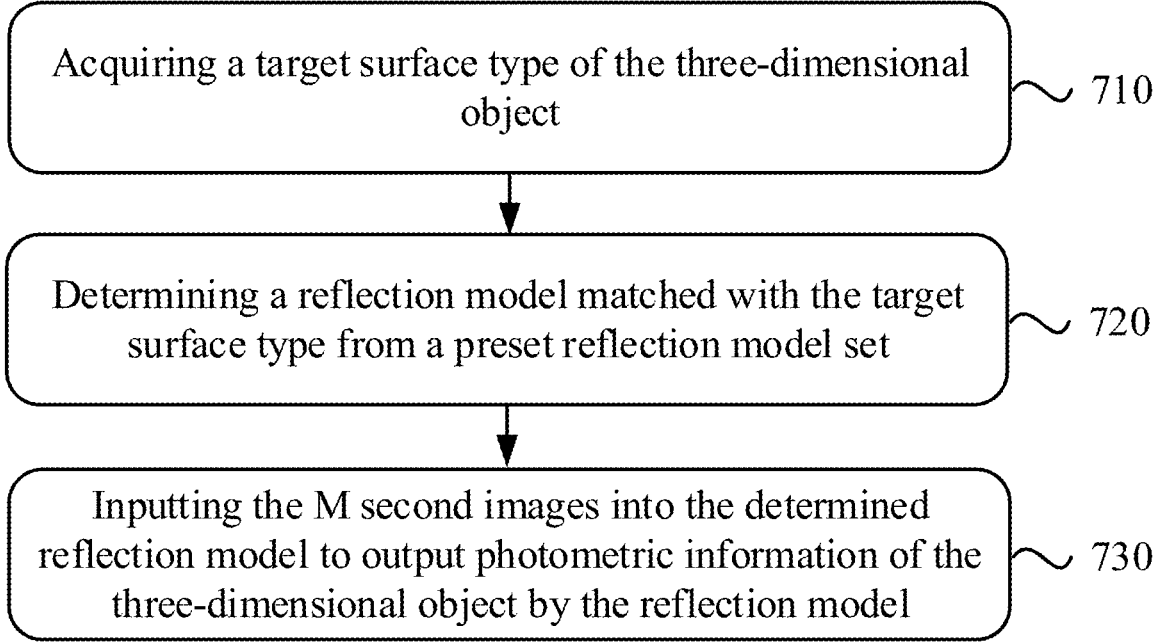
FIG. 7 shows a flowchart of an example of determining photometric information of a three-dimensional object according to an embodiment of the present application.

With respect to some embodiments of step 340 described above, the M second images may be input into a reflection model matched with a target surface type of the three-dimensional object to output photometric information of the three-dimensional object from the reflection model. FIG. 7 shows a flowchart of an example of determining photometric information of a three-dimensional object (i.e., step 340 described above) according to an embodiment of the present application.

As shown in FIG. 7, in step 710, a target surface type of the three-dimensional object is acquired. Here, the surface type may be diversified, such as metallic reflective surfaces and ceramic semi-transparent reflective surfaces. In some examples of the embodiments of the present application, the target surface type of the three-dimensional object to be reconstructed may be detected by various potential or known surface type detection technologies. In other examples of the embodiments of the present application, a target surface type of a three-dimensional object to be reconstructed may be specified by receiving a user operation.

In step 720, a reflection model matched with the target surface type is determined from a preset reflection model set. Here, each reflection model in the reflection model set is configured with a corresponding surface type, for example, for a typical non-Lambert surface (metal, ceramic, etc.), a corresponding reflection model may be pre-configured to characterize its surface reflectivity.

In step 730, the M second images are input into the determined reflection model to output photometric information of the three-dimensional object by the reflection model.

In some examples of the embodiments of the present application, for a metallic reflective surface, the object surface reflection characteristics can be modeled using a Phong model, and for a ceramic semi-transparent reflective surface, a Hanrahan-Krueger(HK) model with a layered reflective structure can be modeled. Therefore, the photometric information of the three-dimensional object can be solved by calling corresponding reflection models for different surface types, and the high precision of the determined photometric information of the three-dimensional object can be ensured.

Figure 8:
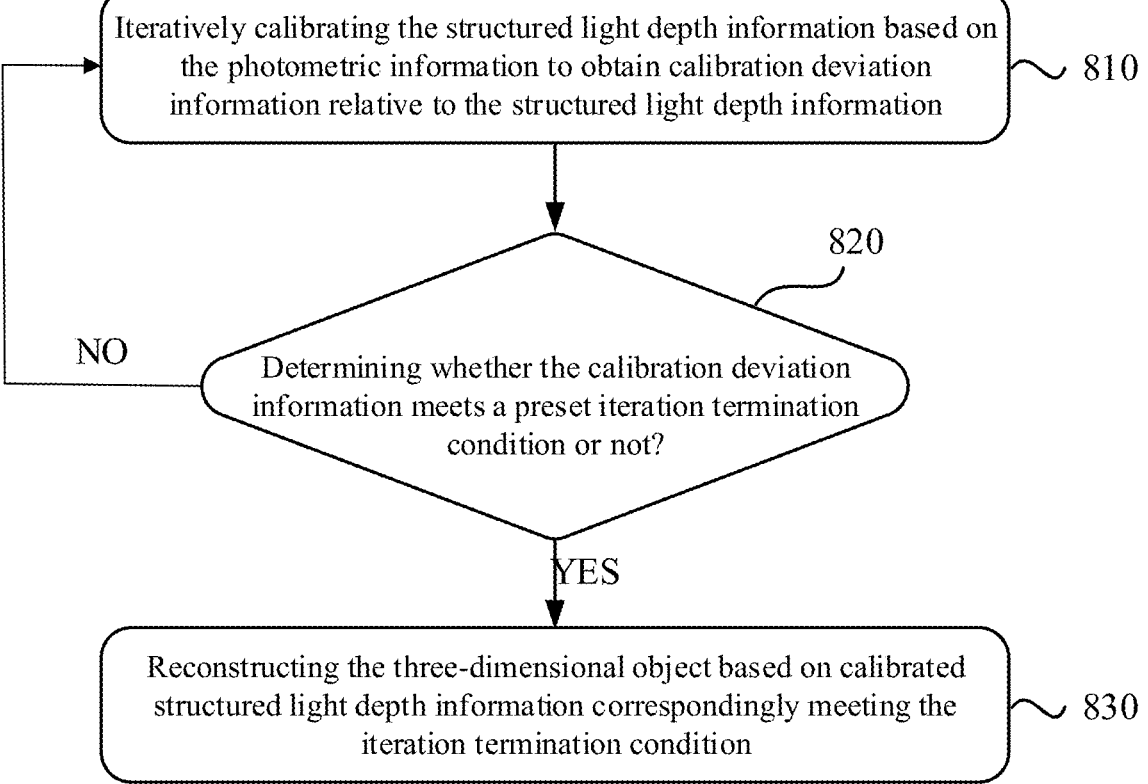
FIG. 8 shows a flowchart of an example of reconstructing a three-dimensional object based on structured light depth information and photometric information according to an embodiment of the present application.

FIG. 8 shows a flowchart of an example of reconstructing a three-dimensional object based on structured light depth information and photometric information according to an embodiment of the present application.

As shown in FIG. 8, in step 810, the structured light depth information is iteratively calibrated based on the photometric information, so as to obtain calibration deviation information relative to the structured light depth information.

It needs to be noted that the change in the reflectivity of the object surface (e.g., the texture of the object surface) may cause the positioning error of the structured light stripes. In some examples of the embodiments of the present application, stripe positioning information (or structured light depth information determined based on the N first images) corresponding to each pixel in the three-dimensional object may be calibrated according to a preset rule (for example, a rule may be determined based on a priori knowledge or a training model) of influence of the reflectivity on the stripe positioning, so as to obtain corresponding updated structured light depth information, and deviation values on the structured light depth information before and after the depth update are calculated.

Specifically, on the basis of the updated depth map (or three-dimensional point cloud structure), the normal vector information of the corresponding three-dimensional object can be obtained through the normal vector calculation criterion, and details about the normal calculation criterion can refer to the description in the related art, which is not repeated herein.

In step 820, whether the calibration deviation information meets a preset iteration termination condition or not is determined. Here, the iteration termination condition may be a termination condition indicating an iterative calibration operation for the step 810 described above.

If the determination result in step 820 indicates that the preset iteration termination condition is met, the step is skipped to the operation in step 830. If the determination result in step 820 indicates that the preset iteration termination condition is not met, the step is skipped to step 810.

In step 830, the three-dimensional object is reconstructed based on the calibrated structured light depth information correspondingly meeting the iteration termination condition.

In the embodiments of the present application, the structured light depth information is iteratively calibrated based on the photometric information, and the error of the structured light depth information caused by the photometric information such as the reflectivity of the surface texture is compensated, so that the high-precision three-dimensional reconstruction result can be ensured.

Figure 9:
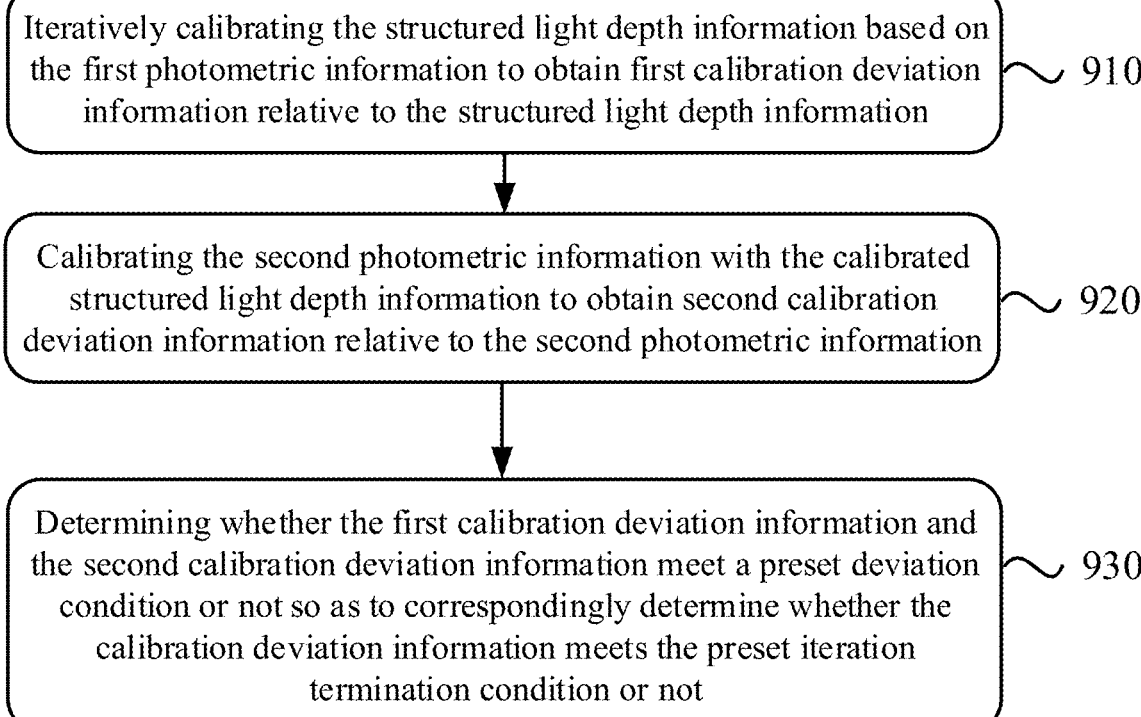
FIG. 9 shows a flowchart of an example of determining whether calibration deviation information meets an iteration termination condition or not according to an embodiment of the present application.

In some examples of the embodiments of the present application, the photometric information may include first photometric information and second photometric information. FIG. 9 shows a flowchart of an example of determining whether calibration deviation information meets an iteration termination condition or not according to an embodiment of the present application.

As shown in FIG. 9, in step 910, the structured light depth information is iteratively 13 calibrated based on the first photometric information, so as to obtain first calibration deviation information relative to the structured light depth information.

In step 920, the second photometric information is calibrated with the calibrated structured light depth information to obtain second calibration deviation information relative to the second photometric information. Illustratively, new second photometric information may be solved from the calibrated structured light depth information and compared with the original second photometric information to obtain corresponding second calibration deviation information.

In step 930, whether the first calibration deviation information and the second calibration deviation information meet a preset deviation condition or not is determined so as to correspondingly determine whether the calibration deviation information meets the preset iteration termination condition or not.

In some embodiments, the first photometric information may be a reflectivity and the second photometric information may be normal information. Therefore, the depth information determined by the structured light system can be calibrated based on the reflectivity determined by the photometric system, the corresponding first deviation value is determined, the calibrated depth information is utilized to reversely deduce the normal information of the three-dimensional object and determine the second deviation value between the normal information of the three-dimensional object and the normal information determined by the photometric system, whether the depth information, the normal information and the reflectivity are successfully adjusted or not is determined through the first deviation value and the second deviation value, and the problems of insufficient calibration or excessive calibration are effectively avoided, such that the final positioning result can simultaneously meet the requirements of the photometric system and the structured light system, and the precision of the reconstructed three-dimensional object can be ensured.

With respect to step 930 described above, in some embodiments, target deviation information of a preset deviation weight allocation corresponding to the first calibration deviation information and the second calibration deviation information can be determined so as to correspondingly determine whether the first calibration deviation information and the second calibration deviation information meet the preset deviation condition or not. Illustratively, the deviation information can be weighted and summed, and whether the iteration termination condition is met or not can be determined correspondingly according to a comparison result of whether the weighted and summed value is smaller than a preset error threshold.

Specifically, based on the reflection characteristics and the stripe positioning method described above, a combined target function which simultaneously meets the constraint requirements of the photometric system and the structured light system is provided:

$$E(x_{pij}, n_{ps}, \varphi_{ij}) = E_{sls}(x_{pij}, n_{ps}) + \lambda E_{ps}(x_{pij}, n_{ps}, \varphi_{ij}) \qquad \text{formula (1)}$$

wherein pij denotes a phase value of an image pixel of coordinates (i, j), $x_{pij}$ denotes depth information determined based on structured light decoding (e.g., a three-dimensional point cloud determined by triangulation principles), ps denotes the photometric system, sls denotes the structured light system, $n_{ps}$ denotes normal information determined based on the photometric system, $\varphi_{ij}$ denotes reflectivity information acquired based on the photometric method, and $\lambda$ denotes a weight value.

Furthermore, $E_{sls}(x_{pij}, n_{ps})$ (in some cases, $E_{sls} = \|n_{ps} \cdot n_{sls}(x_{pij})\|_2^2$) denotes a difference between the target scene normal information solved based on the depth information from the structured light decoding and the target scene normal information determined based on the photometric system, $E_{ps}(x_{pij}, n_{ps}, \varphi_{ij})$ denotes a difference (or a gray level difference) between the depth information determined based on the structured light system and the depth information updated by the photometric system that calibrates a light source based on the depth information, and $E(x_{pij}, n_{ps}, \varphi_{ij})$ denotes a target function combining the structured light system and the photometric system.

By utilizing the optimization model described above, the three-dimensional reconstruction problem in combination with the structured light system and the photometric system can be optimized according to the following modes:

$$(n^*_{ij}, \varphi^*_{ij}, x^*_{pij}) = \arg \min E(x_{pij}, n_{ps}, \rho_{ij})$$

wherein $x^*_{pij}$ denotes depth information of the target object (or the object to be reconstructed) determined by the structured light system and triangulation principles, and $\varphi^*_{ij}$ and $n^*_{ij}$ denote a normal and a reflectivity of the target object determined by the photometric system, respectively.

That is to say, $x^*_{pij}$, $o^*_{ij}$ and $n^*_{ij}$ may be taken as starting points to perform a step-by-step optimization (or iterative optimization) operation, and the depth information, the normal information and the reflectivity information corresponding to a case that a minimum value of $E(x_{pij}, n_{ps}, \varphi_{ij})$ is taken may be taken as the corresponding optimal depth information, normal information and reflectivity information. In some embodiments, $E(x_{pij}, n_{ps}, \rho_{ij})$ may be compared with the set threshold, when $E(x_{pij}, n_{ps}, \rho_{ij})$ is greater than or equal to a set threshold, the corresponding depth information, the reflectivity or the normal information may be updated iteratively until $E(x_{pij}, n_{ps}, \rho_{ij})$ is smaller than the set threshold, then the iteration ends, and at the moment, $E(x_{pij}, n_{ps}, \rho_{ij})$ is the minimum value, so as to implement high-precision three-dimensional reconstruction of a complex object.

It needs to be noted that in the structured light stripe positioning technology, the decoding methods commonly used are a profile fitting method and a weighted gray barycentric method, and are used to implement stripe boundary sub-pixel positioning. In the profile fitting method, the positioning precision of the sub-pixels is acquired by fitting an edge profile function (e.g., a linear function, and a Sigma function). In the weighted gray barycentric method, the barycentric point of the M×N template is acquired by using a gray-scale weighted averaging method, and the precision similar to that of the fitting based on the central point of a Gaussian function can be obtained. These two methods are essentially a gray-scale parametric maximum likelihood estimation in a probabilistic sense, not taking into account the effect of the surface reflection characteristics of the object on the stripe positioning result (e.g., stripe boundaries or stripe profiles). Here, the stripe profile may denote different stripe boundary types, for example, in a binary stripe, the stripe profile comprises a stripe boundary "from black to white" and a stripe boundary "from white to black" in a certain coding direction.

In an example of the embodiment of the present application, a reflection characteristic of an object surface may be introduced as a priori knowledge, and a posterior probability estimation value of a corresponding stripe boundary function parameter is acquired on the basis of the existing stripe sub-pixel positioning. Therefore, the effect of the reflection characteristics of the object surface on the stripe positioning result can be effectively eliminated, so that a more precise stripe positioning result is obtained, and the high precision of the reconstructed three-dimensional object is guaranteed.

Specifically, it is assumed that the gray variable y of the stripe positioning information meets the following Gaussian distribution:

$$p(y)=N(y;u_0,\sigma_0{}^2) \qquad \text{formula (1)}$$

wherein $u_0$ denotes a mean value of the Gaussian distribution of the stripe positioning information, $\sigma_0$ denotes a standard deviation of the Gaussian distribution of the stripe positioning information, y denotes the gray variable of the stripe positioning information, p(y) denotes the probability distribution of the gray variable y, and N denotes the Gaussian distribution.

The likelihood function of the variable y of the stripe positioning information and the reflectivity β of the object surface is as follows:

$$p(\rho|y)=N(\rho;y,u_p,\sigma_p{}^2) \qquad \text{formula (2)}$$

wherein $p(\rho|y)$ denotes a probability distribution of the gray variable y at the reflectivity $\rho$ of the object surface at the stripe positioning information, $u_p$ denotes a mean value of the Gaussian distribution of the stripe positioning information at the reflectivity $\rho$ of the object surface at the stripe positioning information, $\sigma_p$ denotes a standard deviation of the Gaussian distribution of the stripe positioning information at the reflectivity $\rho$ of the object surface at the stripe positioning information, and N ( ) denotes the Gaussian distribution.

Based on the Bayesian formula, $p(y|\varphi \propto p(\rho|y)p(y)$, the posterior probability distribution of y of the stripe positioning information is as follows:

$$p(y \mid \rho) = N\left(y \mid u_N, \sigma_N^2\right) \qquad \text{formula (3)}$$

$$u_N = \frac{N\sigma_0^2}{N\sigma_0^2 + \sigma_\rho^2}m_N + \frac{\sigma_\rho^2}{N\sigma_0^2 + \sigma_\rho^2}u_0 \qquad \text{formula (4)}$$

$$\sigma_N^2 = \frac{\sigma_0^2\sigma_\rho^2}{N\sigma_0^2 + \sigma_\rho^2} \qquad \text{formula (5)}$$

wherein $u_N$ is a maximum posterior probability estimation value of the stripe positioning information solved by using the reflectivity $\rho$ of the object surface at the stripe positioning information as the priori knowledge, and $\sigma_N$ denotes a standard deviation of Gaussian distribution N ( ). Therefore, based on the data distribution condition of the reflectivity and the stripe positioning information in the priori knowledge, the influence rule of the reflectivity on the stripe positioning information is obtained by using a formula in statistics, the stripe positioning information at the corresponding reflectivity is calibrated, and the influence of the surface reflectivity of an object on a stripe positioning result can be eliminated.

In the embodiment of the present application, the optimal solutions (i.e., $E(x_{pij}, n_{ps}, \varphi_{ij})$ meeting a convergence condition) of the reflectivity, the normal direction and the depth value under the two system constraint conditions described above are further obtained through step-by-step iteration (i.e., iteratively updating the depth information determined by the structured light system with the reflectivity determined by the photometric system, and updating the normal information in the photometric system with the updated structured light depth information), so as to realize high-precision reconstruction of the three-dimensional object.

In another example of the embodiment of the present application, when the structured light depth information is updated with reflectivity, photometric information (e.g., reflectivity) and the structured light depth information determined based on the N first images may also be input into the depth information calibration model to output calibrated structured light depth information accordingly. Here, each training sample of the training sample set in the depth information calibration model comprises structured light depth information corresponding to Q pieces of photometric information, Q being a positive integer. In this way, the influence of photometric information on the structured light depth information can be automatically learned through the samples in the depth information calibration model, and the structured light depth information corresponding to the photometric information can be output based on the input photometric information and the initial depth information determined by the structured light system in the machine learning model, so as to reduce or compensate for errors caused by photometric information (e.g., reflectivity) of the object surface to the positioning result of the structured light system.

Figure 10:
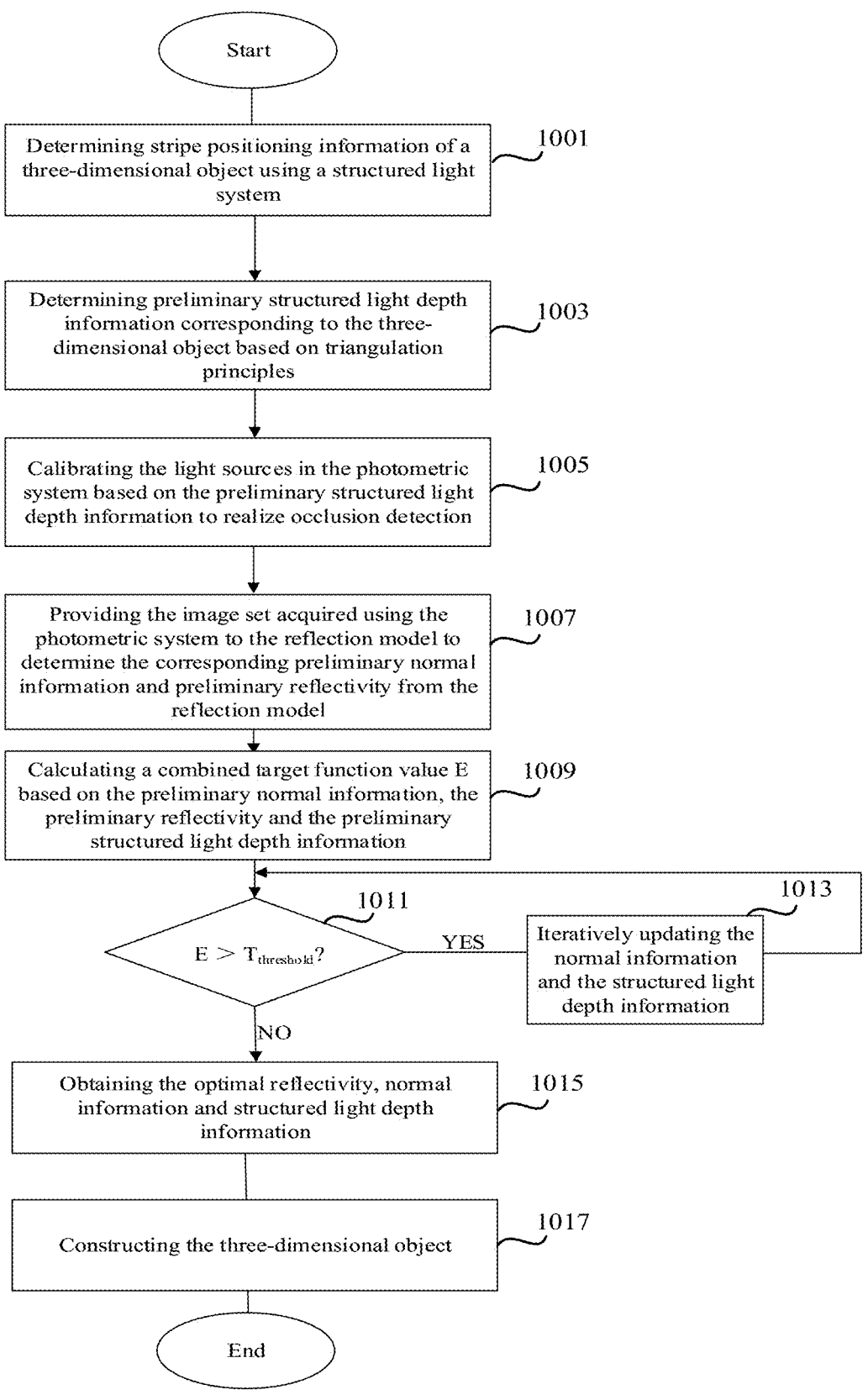
FIG. 10 shows a flowchart of an example of reconstructing a three-dimensional object based on a photometry and structured light combined system according to an embodiment of the present application.

FIG. 10 shows a flowchart of an example of reconstructing a three-dimensional object based on a photometry and structured light combined system according to the embodiment of the present application.

As shown in FIG. 10, in step 1001, stripe positioning information of a three-dimensional object is determined using a structured light system.

In step 1003, preliminary structured light depth information of the three-dimensional object is determined based on triangulation principles and stripe positioning information of the three-dimensional object.

In step 1005, the light sources in the photometric system are calibrated based on the preliminary structured light depth information to realize occlusion detection, so as to avoid the influence of the occlusion area on the measurement result of the photometric system.

In step 1007, the image set acquired using the photometric system is provided to the reflection model to determine the corresponding preliminary normal information and preliminary reflectivity from the reflection model.

In step 1009, a combined target function value E is calculated based on the preliminary normal information, the preliminary reflectivity and the preliminary structured light depth information. For details of the calculation of the combined target function value, reference may be made to the description in the foregoing related embodiments, and details are not repeated herein.

In step 1011, whether the combined target function value E is greater than a preset threshold $T_{threshold}$ or not is determined.

If the determination result in step 1011 is that $E>T_{threshold}$, the step is skipped to step 1013. If the determination result in step 1011 is that $E \leq T_{threshold}$, the step is skipped to step 1015.

In step 1013, the normal information and the structured light depth information are iteratively updated. For details of the updating operation of the normal information and the structured light depth information, reference may be made to the description in the foregoing related embodiments, and details are not repeated herein.

In step 1015, the normal information, the reflectivity and the structured light depth information at the end of the iteration may be determined as the optimal normal information, reflectivity and structured light depth information.

In step 1017, the three-dimensional object is reconstructed using one or more of the determined optimal normal information, reflectivity and structured light depth information, for example, the three-dimensional object may be reconstructed by the optimal structured light depth information or may be reconstructed by the optimal normal information and reflectivity.

In the embodiment of the present application, the photometric system and the structured light system are combined, the surface reflectivity is introduced into a stripe positioning method based on the structured light system, and finally the optimal normal information, reflectivity and structured light depth information are solved iteratively based on combined target function constraint of the combined system. Therefore, based on the photometry and structured light combined system, the reflection characteristics of a target scene (or the surface of the three-dimensional object) are introduced into the stripe positioning to eliminate the influence of the surface reflectivity on the stripe positioning, so that the reconstruction precision of the structured light is improved, the problem of positioning optimization under the combined system is solved, and the reconstruction precision of the non-Lambert surface can be effectively improved by solving the optimal three-dimensional reconstruction information through two steps of iteration.

Figure 11A:
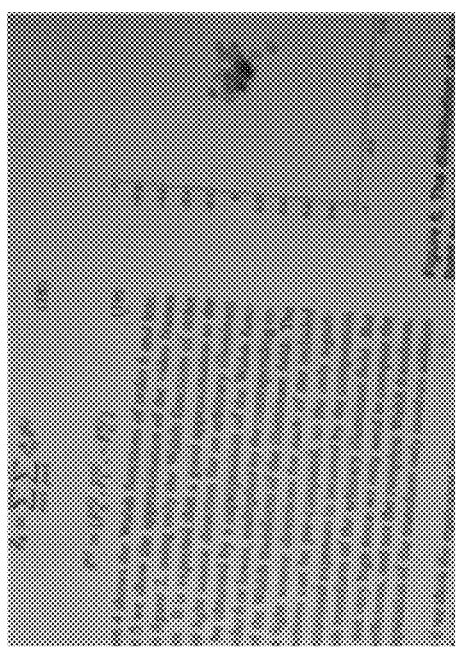
FIG. 11A shows a schematic diagram of an example of a paper with various textures to be reconstructed.
Figure 11B:
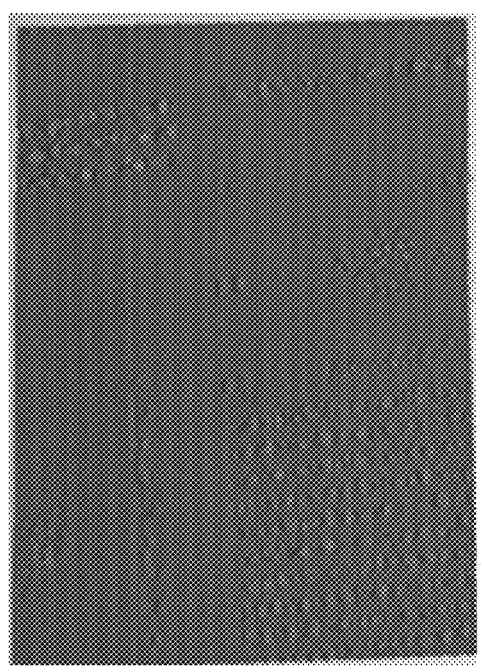
FIG. 11B shows a schematic diagram of an example of a reconstruction result of the paper in FIG. 11A based on the first structured light system.
Figure 11C:
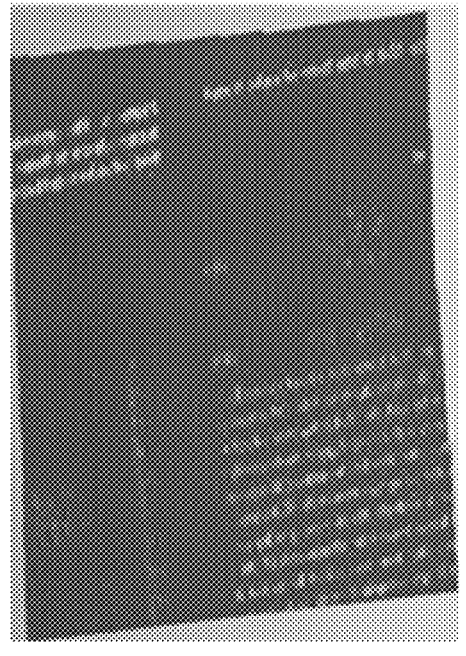
FIG. 11C shows a schematic diagram of an example of a reconstruction result of the paper in FIG. 11A based on a second structured light system.
Figure 11D:
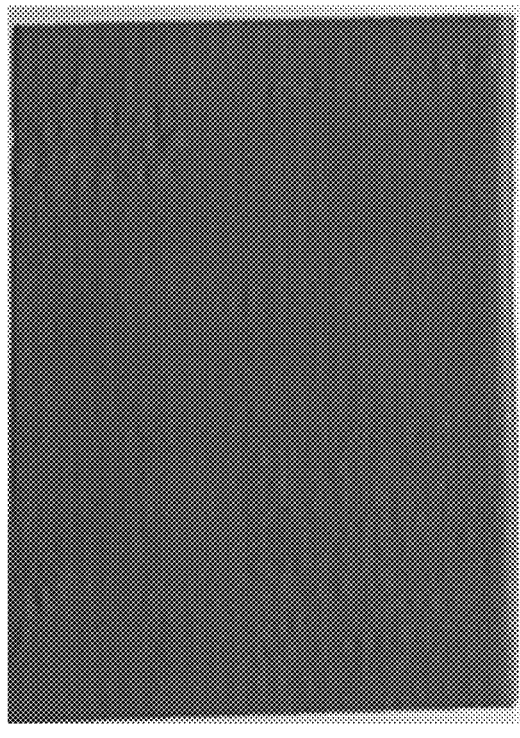
FIG. 11D shows a schematic diagram of an example of a reconstruction result of the paper in FIG. 11A based on the combined system according to an embodiment of the present application.

FIG. 11A shows a schematic diagram of an example of a paper with various textures to be reconstructed. FIG. 11B shows a schematic diagram of an example of a reconstruction result of the paper in FIG. 11A based on the first structured light system. FIG. 11C shows a schematic diagram of an example of a reconstruction result of the paper in FIG. 11A based on a second structured light system. FIG. 11D shows a schematic diagram of an example of a reconstruction result of the paper in FIG. 11A based on the combined system according to an embodiment of the present application. It is easy to see that the influence of the surface texture on the reconstruction result can be effectively reduced by the combined system to obtain a smoother and more real three-dimensional reconstruction result.

Figure 12A:
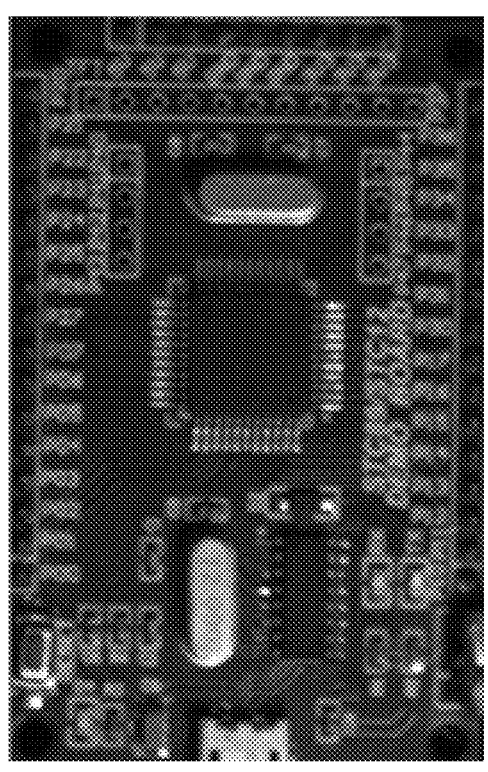
FIG. 12A shows a schematic diagram of an example of a circuit board having a surface with multiple reflective properties to be reconstructed.
Figure 12B:
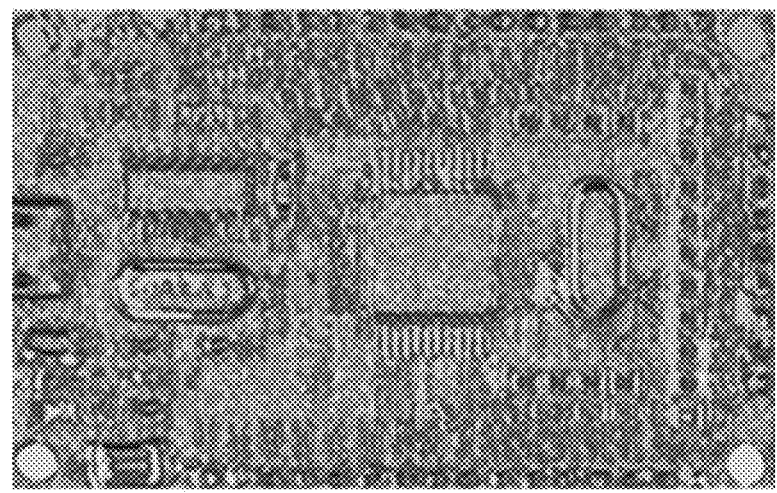
FIG. 12B shows a schematic diagram of an example of the reconstruction result of the circuit board in FIG. 12A based on a single structured light system.
Figure 12C:
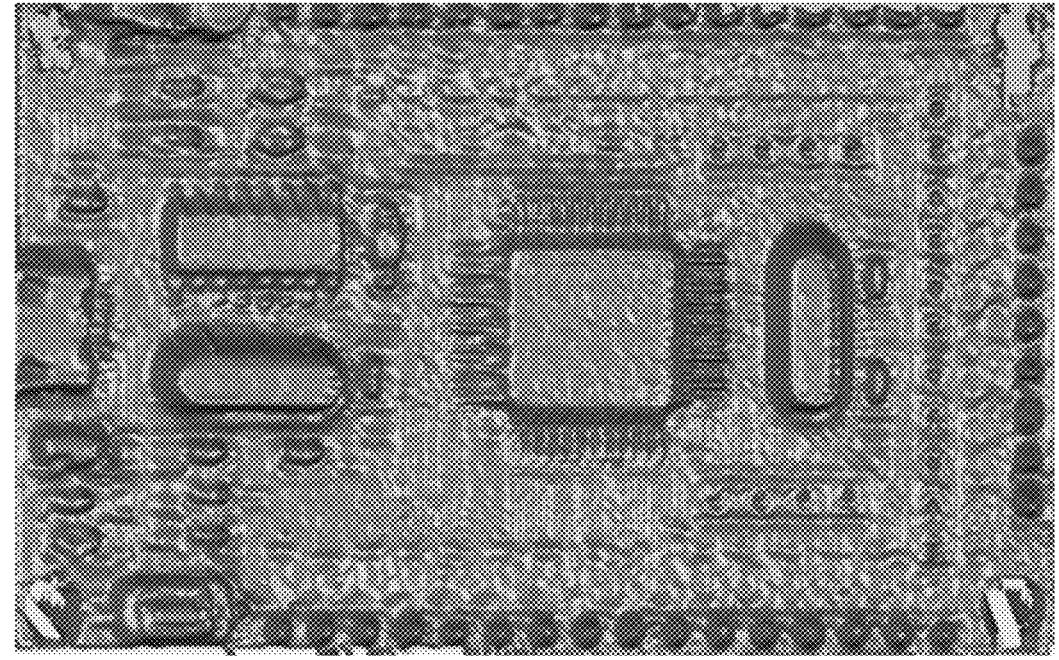
FIG. 12C shows a schematic diagram of an example of a reconstruction result of the paper in FIG. 12A based on the combined system according to an embodiment of the present application.

FIG. 12A shows a schematic diagram of an example of a circuit board having a surface with multiple reflective properties to be reconstructed. FIG. 12B shows a schematic diagram of an example of the reconstruction result of the circuit board in FIG. 12A based on a single structured light system. FIG. 12C shows a schematic diagram of an example of a reconstruction result of the paper in FIG. 12A based on the combined system according to an embodiment of the present application. By comparison, it can be found that when the combined system of the embodiment of the present application is applied to reconstruct a complex scene consisting of multiple reflection characteristics, a reconstruction result with more details can be obtained.

Figure 13A:
FIG. 13A shows a schematic diagram of an example of a bowl to be reconstructed.
Figure 13B:
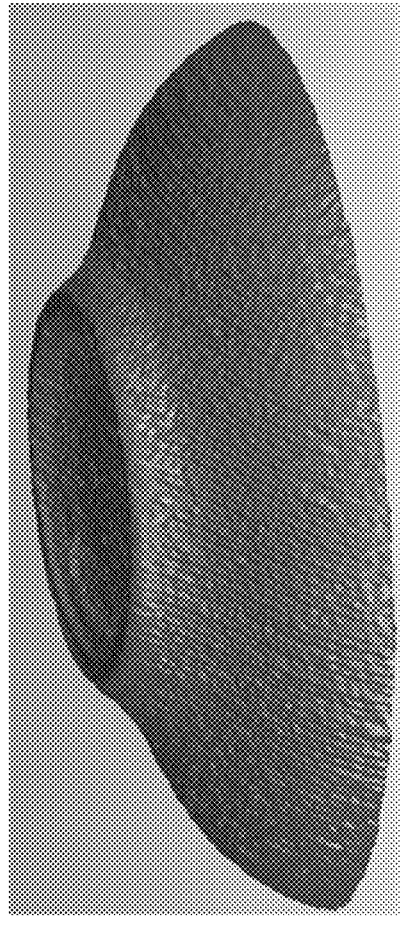
FIG. 13B is a schematic diagram of an example of the reconstruction result of the bowl in FIG. 13A based on a single structured light system.
Figure 13C:
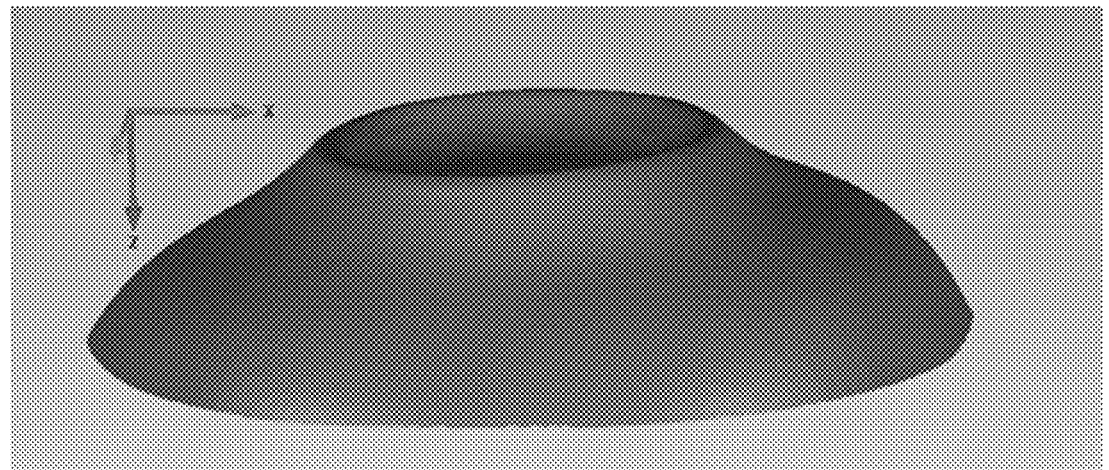
FIG. 13C shows a schematic diagram of an example of the reconstruction result of the bowl in FIG. 13A based on a single photometric system.
Figure 13D:
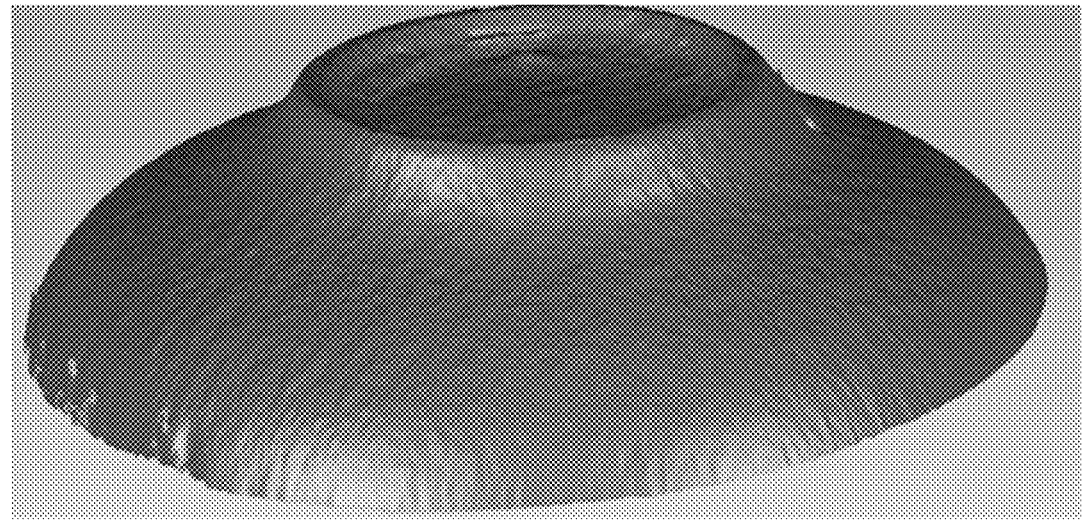
FIG. 13D shows a schematic diagram of an example of a reconstruction result of the bowl in FIG. 13A based on the combined system according to the embodiment of the present application.

FIG. 13A shows a schematic diagram of an example of a bowl to be reconstructed. FIG. 13B is a schematic diagram of an example of the reconstruction result of the bowl in FIG. 13A based on a single structured light system. FIG. 13C shows a schematic diagram of an example of the reconstruction result of the bowl in FIG. 13A based on a single photometric system. FIG. 13D shows a schematic diagram of an example of a reconstruction result of the bowl in FIG. 13A based on the combined system according to the embodiment of the present application.

It can be seen from the above comparison results, compared with a single structured light system, the combined system and the corresponding decoding algorithm in the embodiment of the present application can obtain a smoother and more accurate reconstruction result, and can reduce or eliminate the influence of non-Lambert surface reflectivity difference and rich surface texture on the structured light reconstruction result.

Figure 14:
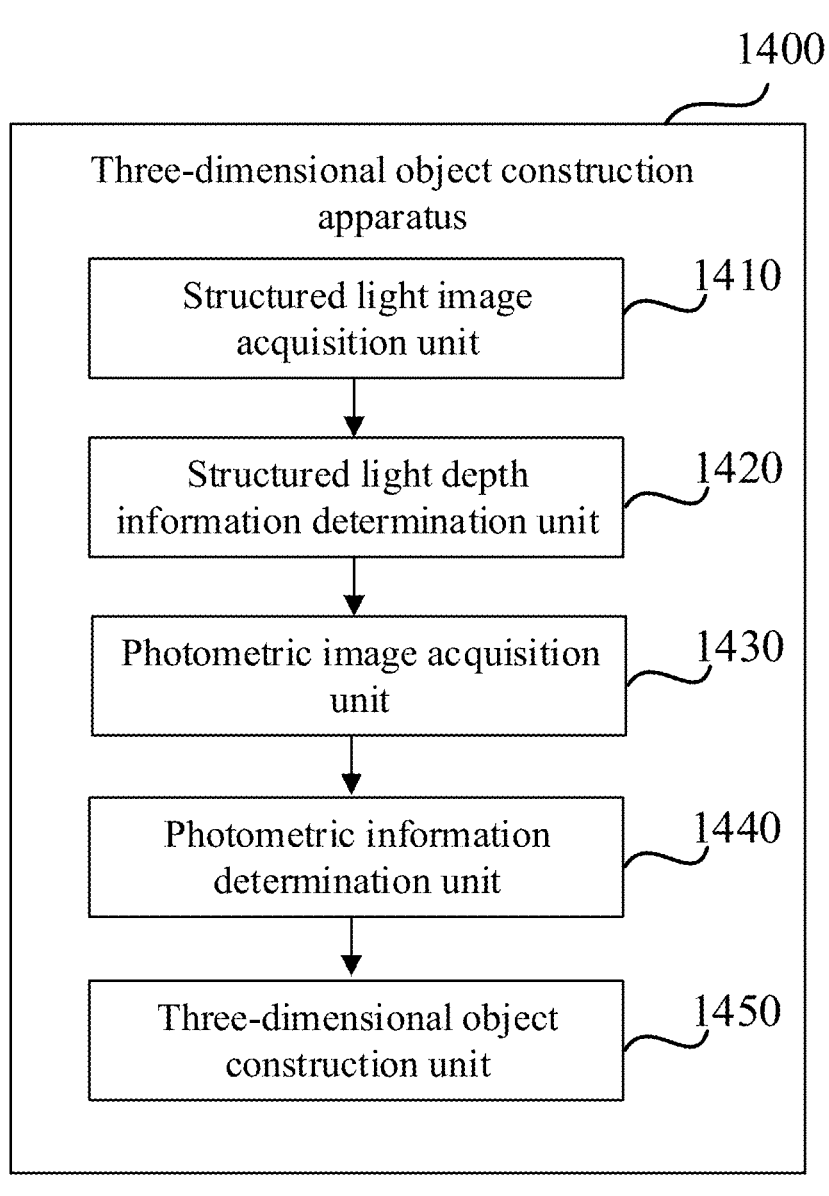
FIG. 14 shows a block diagram of an example of the apparatus for reconstructing a three-dimensional object combining structured light and photometry according to an embodiment of the present application.

FIG. 14 shows a block diagram of an example of the apparatus for reconstructing a three-dimensional object combining structured light and photometry according to an embodiment of the present application.

As shown in FIG. 14, an apparatus 1400 for reconstructing a three-dimensional object combining structured light and photometry comprises a structured light image acquisition unit 1410, a structured light depth information determination unit 1420, a photometric image acquisition unit 1430, a photometric information determination unit 1440, and a three-dimensional object reconstruction unit 1450.

The structured light image acquisition unit 1410 is configured for acquiring N first images. Here, each first image is obtained by shooting after a coded pattern having a coding stripe sequence is projected to a three-dimensional object, N being a positive integer.

The structured light depth information determination unit 1420 is configured for determining structured light depth information of the three-dimensional object based on the N first images.

The photometric image acquisition unit 1430 is configured for acquiring M second images, wherein the M second images are obtained by shooting after P light sources are respectively projected to the three-dimensional object from different directions, and M and P are positive integers.

The photometric information determination unit 1440 is configured for determining photometric information of the three-dimensional object based on the M second images.

The three-dimensional object reconstruction unit 1450 is configured for reconstructing the three-dimensional object based on the structured light depth information and the photometric information.

It should be noted that, for the information interaction, execution process, and other contents between the above apparatuses/units, the specific functions and technical effects thereof based on the same concept as those of the method embodiment of the present application can be specifically referred to the portion of method embodiments, which is not repeated herein.

Figure 15:
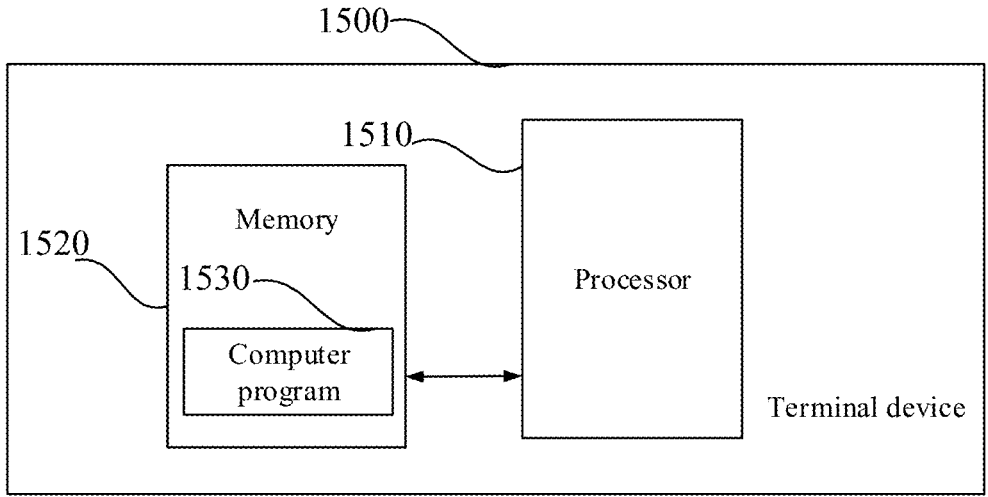
FIG. 15 is a schematic diagram of an example of the terminal device according to an embodiment of the present application.

FIG. 15 is a schematic diagram of an example of the terminal device according to an embodiment of the present application. As shown in FIG. 15, the terminal device 1500 of the embodiment comprises: a processor 1510, a memory 1520, and a computer program 1530 stored in the memory 1520 and executable on the processor 1510. The processor 1510, when executing the computer program 1530, implements the steps in the embodiment of the method for reconstructing a three-dimensional object combining structured light and photometry as described above, such as steps 310 to 350 shown in FIG. 3. Or, the processor 1510, when executing the computer program 1530, implements the functions of each module/unit in each apparatus embodiment as described above, for example, the functions of the units 1410 to 1450 shown in FIG. 14.

Illustratively, the computer program 1530 may be divided into one or more modules/units that are stored in the memory 1520 and executed by the processor 1510 to complete the present application. The one or more modules/units may be a series of computer program instruction segments capable of performing certain functions, the instruction segments being configured for describing the execution process of the computer program 1530 in the terminal device 1500. For example, the computer program 1530 may be segmented into a structured light image acquisition module, a structured light depth information determination module, a photometric image acquisition module, a photometric information determination module and a three-dimensional object reconstruction module, all of which may be used to perform the operations as in steps 310 to 350, respectively.

The terminal device 1500 may be a computing device such as a desktop computer, a notebook, a personal digital assistant, and a cloud server. The terminal device may comprise, but is not limited to, a processor 1510 and a memory 1520. Those skilled in the art may appreciate that FIG. 15 is merely an example of the terminal device 1500, and does not constitute a limitation of the terminal device 1500, and may comprise more or fewer components than those shown, or some of the components may be combined, or different components may be comprised, for example, the terminal device may further comprise input-output devices, network access devices, buses, etc.

The processor 1510 may be a central processing unit (CPU), and may also be other general-purpose processor, a digital signal processor (DSP), an application specific integrated circuit (ASIC), a field programmable gate array (FPGA) or other programmable logic device, a discrete component gate or a transistor logic device, a discrete hardware component, or the like. The general-purpose processor may be a microprocessor or the processor may be any conventional processor or the like.

The memory 1520 may be an internal storage unit of the terminal device 1500, such as a hard disk or memory of the terminal device 1500. The memory 1520 may also be an external storage device of the terminal device 1500, such as a plug-in hard disk, a smart media card (SMC), a secure digital (SD) card, or a flash card, arranged on the terminal device 1500. Furthermore, the memory 1520 may further comprise both an internal storage unit and an external storage device of the terminal device 1500. The memory 1520 is configured for storing the computer program and other programs and data required by the terminal device. The memory 1520 may also be configured for temporarily storing data that have been output or are to be output.

It should be clear to those skilled in the art that, for convenience and simplicity of description, the above division of the functional units and modules is only used for illustration, and in practical applications, the above functions may be distributed as different functional units and modules as needed, that is, the internal structure of the above apparatus may be divided into different functional units or modules to implement all or part of the above functions. The functional units and modules in the embodiment can be integrated in one processing unit, or each unit can exist physically alone, or two or more units can be integrated in one unit. The above integrated units can be realized in the form of hardware or software functional units. In addition, the specific names of each functional unit and module are only for convenience of distinguishing from each other, and are not used to limit the protection scope of the present application. For the specific working processes of the units and modules in the system, reference may be made to the corresponding processes in the above method embodiments.

In the above embodiments, the description of each embodiment has its own emphasis. For the parts not detailed or recorded in one embodiment, please refer to the related descriptions of other embodiments.

Those of ordinary skill in the art can realize that the units and algorithm steps of each example described in connection with the embodiments disclosed herein can be implemented by electronic hardware, or the combination of computer software and electronic hardware. Whether these functions are performed by hardware or software depends on the specific application and design constraints of the technical solutions. Professionals can use different methods to realize the described functions for each specific application, but this realization should not be considered beyond the scope of the present application.

In the embodiments provided in the present application, it should be understood that the disclosed apparatus/terminal device and method may be implemented in other ways. For example, the above-described apparatus/terminal device embodiments are merely illustrative, and for example, the division of the modules or units is only a logical function division, and other divisions may be realized in practice, for example, multiple units or components may be combined or integrated into another system, or some features may be omitted, or not executed. In addition, the shown or discussed mutual coupling or direct coupling or communication connection may be indirect coupling or communication connection through some interfaces, apparatuses or units, which may be in electrical, mechanical or other forms.

The units described as separate parts may or may not be physically separate, and parts displayed as units may or may not be physical units, may be located in one position, or may be distributed on multiple network units. Some or all of the units can be selected according to the actual needs to achieve the purpose of this embodiment.

In addition, the functional units in the embodiments of the present application can be integrated into one processing unit, or each unit can exist physically alone, or two or more units can be integrated in one unit. The above integrated units can be realized in the form of hardware or software functional units.

The integrated module/unit may be stored in a computer-readable storage medium if it is implemented in the form of a software functional unit and sold or used as a separate product. Based on such understanding, all or part of the flow of the method of the embodiments described above can also be implemented by instructing relevant hardware by a computer program, and the computer program can be stored in a computer-readable storage medium; the computer program, when executed by a processor, can implement the steps in any one of the above method embodiments. The computer program comprises computer program codes which may be in the form of source code, object code, an executable file or some intermediate form, etc. The computer-readable medium may comprise: any entity or apparatus capable of carrying computer program codes, a recording medium, a U-drive, a removable hard drive, a magnetic disk, an optical disk, a computer memory, a read-only memory (ROM), a random access memory (RAM), an electrical carrier signal, a telecommunications signal, a software distribution medium, and the like. It should be noted that the contents contained in the computer-readable medium can be appropriately increased or decreased according to the requirements of legislation and patent practice in jurisdictions, for example, in some jurisdictions, the computer-readable medium does not comprise an electrical carrier signal or a telecommunications signal in accordance with legislative and proprietary practices.

The above embodiments are only used to illustrate the technical solutions of the present application, and not to limit the same; although the present application has been described in detail with reference to the above embodiments, it should be understood by those of ordinary skill in the art that: the technical solutions described in the above embodiments may still be modified, or some technical features may be equivalently replaced; such modifications and substitutions do not depart from the spirit and scope of the embodiments of the present application, all of which should fall within the protection range of the present application.

What is claimed is:

1. A method for reconstructing a three-dimensional object combining structured light and photometry, comprising:

acquiring N first images, wherein each first image is obtained by shooting after a coded pattern having a coding stripe sequence is projected to a three-dimensional object, and N is a positive integer;

determining structured light depth information of the three-dimensional object based on the N first images;

acquiring M second images, wherein the M second images are obtained by shooting after P light sources are respectively projected to the three-dimensional object from different directions, and M and P are positive integers;

determining photometric information of the three-dimensional object based on the M second images; and reconstructing the three-dimensional object based on the structured light depth information and the photometric information, wherein reconstructing the three-dimensional object based on the structured light depth information and the photometric information comprises:

iteratively calibrating the structured light depth information based on the photometric information to obtain calibration deviation information relative to the structured light depth information;

determining whether the calibration deviation information meets a preset iteration termination condition or not; and if yes, reconstructing the three-dimensional object based on calibrated structured light depth information correspondingly meeting the iteration termination condition.

2. The method for reconstructing a three-dimensional object combining structured light and photometry according to claim 1, wherein prior to acquiring M second images, the method further comprises:

determining positions and projection directions of the P light sources according to the structured light depth information.

3. The method for reconstructing a three-dimensional object combining structured light and photometry according to claim 1, wherein determining photometric information of the three-dimensional object based on the M second images specifically comprises:

inputting the M second images into a reflection model matched with a target surface type of the three-dimensional object to output the photometric information of the three-dimensional object by the reflection model.

4. The method for reconstructing a three-dimensional object combining structured light and photometry according to claim 1, wherein the photometric information comprises a first photometric information and a second photometric information, wherein iteratively calibrating the structured light depth information based on the photometric information to obtain first calibration deviation information relative to the structured light depth information comprises:

iteratively calibrating the structured light depth information based on the first photometric information to obtain first calibration deviation information relative to the structured light depth information;

correspondingly, determining whether the calibration deviation information meets a preset iteration termination condition or not comprises:

calibrating the second photometric information with the calibrated structured light depth information to obtain second calibration deviation information relative to the second photometric information; and determining whether the first calibration deviation information and the second calibration deviation information meet a preset deviation condition or not so as to correspondingly determine whether the calibration deviation information meets the preset iteration termination condition or not.

5. The method for reconstructing a three-dimensional object combining structured light and photometry according to claim 4, wherein the first photometric information is a reflectivity and the second photometric information is normal information.

6. The method for reconstructing a three-dimensional object combining structured light and photometry according to claim 4, wherein determining whether the first calibration deviation information and the second calibration deviation information meet a preset deviation condition or not comprises:

determining target deviation information of a preset deviation weight allocation corresponding to the first calibration deviation information and the second calibration deviation information; and correspondingly determining whether the first calibration deviation information and the second calibration deviation information meet the preset deviation condition or not according to a comparison result of whether the target deviation information is smaller than preset deviation threshold information or not.

7. The method for reconstructing a three-dimensional object combining structured light and photometry according to claim 1, wherein iteratively calibrating the structured light depth information based on the photometric information comprises:

inputting the photometric information and the structured light depth information into a depth information calibration model to correspondingly output the calibrated structured light depth information, wherein each training sample of a training sample set in the depth information calibration model comprises structured light depth information corresponding to Q pieces of photometric information, and Q is a positive integer.

\* \* \* \* \*